United States Patent [19]
Plank et al.

[11] Patent Number: 5,655,865
[45] Date of Patent: *Aug. 12, 1997

[54] ATTACHMENT ARRANGEMENT

[75] Inventors: Wolfgang Plank, Tosters; Kurt Waibl, Götzis, both of Austria

[73] Assignee: Hilti Aktiengeschaft, Furstentum, Liechtenstein

[*] Notice: The term of this patent shall not extend beyond the expiration date of Pat. No. 5,489,173.

[21] Appl. No.: 491,430

[22] Filed: Jun. 16, 1995

[30] Foreign Application Priority Data

Jun. 17, 1994 [DE] Germany .................. 44 21 252.6

[51] Int. Cl.⁶ .................................................. F16B 27/00
[52] U.S. Cl. .................. 411/85; 403/257; 403/405.1; 411/104; 411/432
[58] Field of Search .................. 403/22, 257, 259, 403/261, 405.1, 407.1; 411/84, 85, 104, 432

[56] References Cited

U.S. PATENT DOCUMENTS

| | | | |
|---|---|---|---|
| 2,384,729 | 9/1945 | Darby | 411/85 |
| 4,410,298 | 10/1983 | Kowalski | 411/104 X |
| 4,460,299 | 7/1984 | Kowalski | 411/104 X |
| 4,645,393 | 2/1987 | Pletcher | 403/407.1 X |
| 4,666,355 | 5/1987 | Stover | 411/85 |
| 4,840,525 | 6/1989 | Rebentisch | 411/85 |
| 5,067,863 | 11/1991 | Kowalski | 411/85 |
| 5,489,173 | 2/1996 | Hofle | 411/85 |

FOREIGN PATENT DOCUMENTS

| | | | |
|---|---|---|---|
| 2636687 | 3/1990 | France | 411/85 |
| 597450 | 4/1978 | Switzerland . | |

Primary Examiner—Blair Johnson
Assistant Examiner—Andrea Chop
Attorney, Agent, or Firm—Anderson Kill & Olick P.C.

[57] ABSTRACT

An attachment arrangement for securing components or construction parts to an attachment rail (32) with a slot-like opening (34). The attachment arrangement includes a spring element (27) for improved handling which is deflectable both in the axial and radial directions. An axially elastic region (28) of the spring element (27) provides an axial prestress between a base member (21) and an intermediate member (29) whereby spontaneous detachment of the attachment arrangement by turning the base member (21) through 90 degrees relative to the attachment rail (32) is prevented.

4 Claims, 4 Drawing Sheets

ATTACHMENT ARRANGEMENT

BACKGROUND OF THE INVENTION

The present invention is directed to an attachment arrangement including a base member, an intermediate member and a cooperating part. The base member has a non-circular head containing an interior thread and at least a first anti-rotation surface. The intermediate member has at least one through opening and at least a second anti-rotation surface for effecting a rotationally locked connection for the attachment arrangement.

An assembly arrangement is disclosed in CH-PS 597 450 and includes a cooperating part in the form of an attachment rail having a hollow section with a rectangular cross section and a slot-like opening extending in the longitudinal direction for the insertion of one or several attachment devices. The width of the slot-like opening is limited by free ends of two legs.

The attachment device is made up of a base member with a non-circular head, an intermediate member and an attachment element, so that the attachment element can clamp or stress the base member and the intermediate member against one another. To secure such an attachment device to the attachment rail located, for instance, on a ceiling and provided with two slot-like openings facing downwardly, the base member of the attachment device is placed into the slot-like opening and turned through 90 degrees whereby the non-circular head comes to rest inside the attachment rail at the internal sides of the two legs.

In this known solution, however, the attachment device can turn by itself due to shocks or jarring, whereby the attachment device can fall out of the opening in the attachment rail. If the attachment rail is located at a considerable height, and the attachment device falls it can cause considerable injury to a person standing below the attachment arrangement.

SUMMARY OF THE INVENTION

Therefore, the primary object of the present invention is to provide an attachment arrangement where an attachment device can be inserted into a slot-like opening of a cooperating part in such a way that it is axially displaceable and secured against spontaneous turning.

In accordance with the present invention, the cooperating part has a non-circular opening permitting the insertion of the head of the base member in a specific angular position and a spring mounted on the base member is arranged so that it flexes parallel to the thread axis in the base member.

The spring element of the invention makes possible the fastening of the attachment device against spontaneous turning after the attachment device with the non-circular head has been placed into the slot-like opening of the cooperating part and turned through 90 degrees. The spring element presses the non-circular head of the base part against the inside wall of the cooperating part in the region of the opening. The base member is non-rotationally connected with the intermediate member, so that the base member can be turned in a circumferential direction by the intermediate member. The rotationally locked connection is achieved by the spring element.

Preferably, the spring element is located between the base member and the intermediate member so that clamping of the base member and the intermediate member relative to the cooperating part can take place. The spring element is in an axially fixed connection with the base member and the intermediate member.

If the spring element is not prestressed, the base member and the intermediate member of the attachment device are located closer to one another. The spring element can be placed under prestress by moving the base member away from the intermediate member.

By using a spring element preferably deflecting perpendicularly to the axis of the thread, and with the spring element at least partially protruding with its radially unloaded outside contour beyond the projection of the opening, it is possible to fix the attachment device in the opening of the cooperating part for temporary retention, without turning the base member.

Expediently, the spring element has first matching surfaces and second matching surfaces cooperating with the first anti-rotation surfaces on the base member and the second anti-rotation surfaces on the intermediate member. Preferably, the first matching surfaces on the spring element are formed by edge surfaces and the first anti-rotation surfaces by projecting surfaces. The edge surfaces are part of side recesses in the region of the through opening in the spring element. The side recesses are open on the surface of the spring element from which the second matching surfaces project. The first anti-rotation surfaces of the base member cooperating with the edge surfaces extend essentially radially from an extension of the base member formed basically as a hollow cylinder. The outside diameter of the extension corresponds essentially to the diameter of the central through opening in the spring element. By the simple alignment of the projections relative to the edge surfaces and by compressing the spring element with the base member, a snap-in-like connection of these two parts is achieved. The second matching surfaces on the spring element are expediently formed by pins and the second anti-rotation surfaces by openings. The diameter of the openings are slightly smaller than the diameters of the pins. The pins can be pressed into the opening in such a way that the base member is axially fixed and non-rotationally connected by the spring element to the intermediate member. Profiled surfaces on the inside of the openings and on the outer surfaces of the pins serve to provide an improved connection.

Preferably, the cooperating part is formed as an attachment rail with an essentially rectangular, C-shaped hollow section and with a slot-like opening into the hollow section. The width of the opening is limited by two parallel legs extending into the inside of the hollow section. The attachment device can be engaged in a snap-in-like manner with the cooperating part by turning it through 90 degrees or by means of the spring element. In this pre-assembled position, displacement of the attachment device along the opening of the cooperating part is possible.

The base member and the intermediate member are drawn together by an attachment part in the form of a screw or threaded rod with the interposition of the legs of the cooperating part, for fastening the attachment device at a specific location on the attachment rail.

Such attachment arrangements are particularly suitable for installing pipelines, where the pipelines are connected by appropriate pipe clips or clamps and attachment parts in the form of threaded rods. To fasten such threaded rods to the attachment arrangement, is merely necessary to push the rods through the opening in the center of the intermediate member and then screw the rod into the thread in the base member. The base member and the intermediate member can be drawn together by tightening a locknut positioned on the threaded rod.

The cooperating part is preferably a component with a non-circular recess into which the attachment device can be pre-assembled in a snap-in-like manner. The cooperating part carrying the attachment device can be conveyed with one hand as an installation unit, for instance to an additional section of the attachment rail. If the cooperating part along with the attachment device is located at the correct point of the attachment rail, the intermediate member of the attachment device can be turned by hand through 90 degrees in a circumferential direction, so that the base member grips in engagement with the free ends of the legs of the attachment rail.

To provide security of any undesired turning of a component relative to the attachment device, in an expedient arrangement, the intermediate member has at least one projection serving as an anti-rotation device for the cooperating part formed as a component, and the projection extends into the central opening of the cooperating part.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which there is illustrated and described a preferred embodiment of the invention.

DETAILED DESCRIPTION OF THE INVENTION

Figure 1:
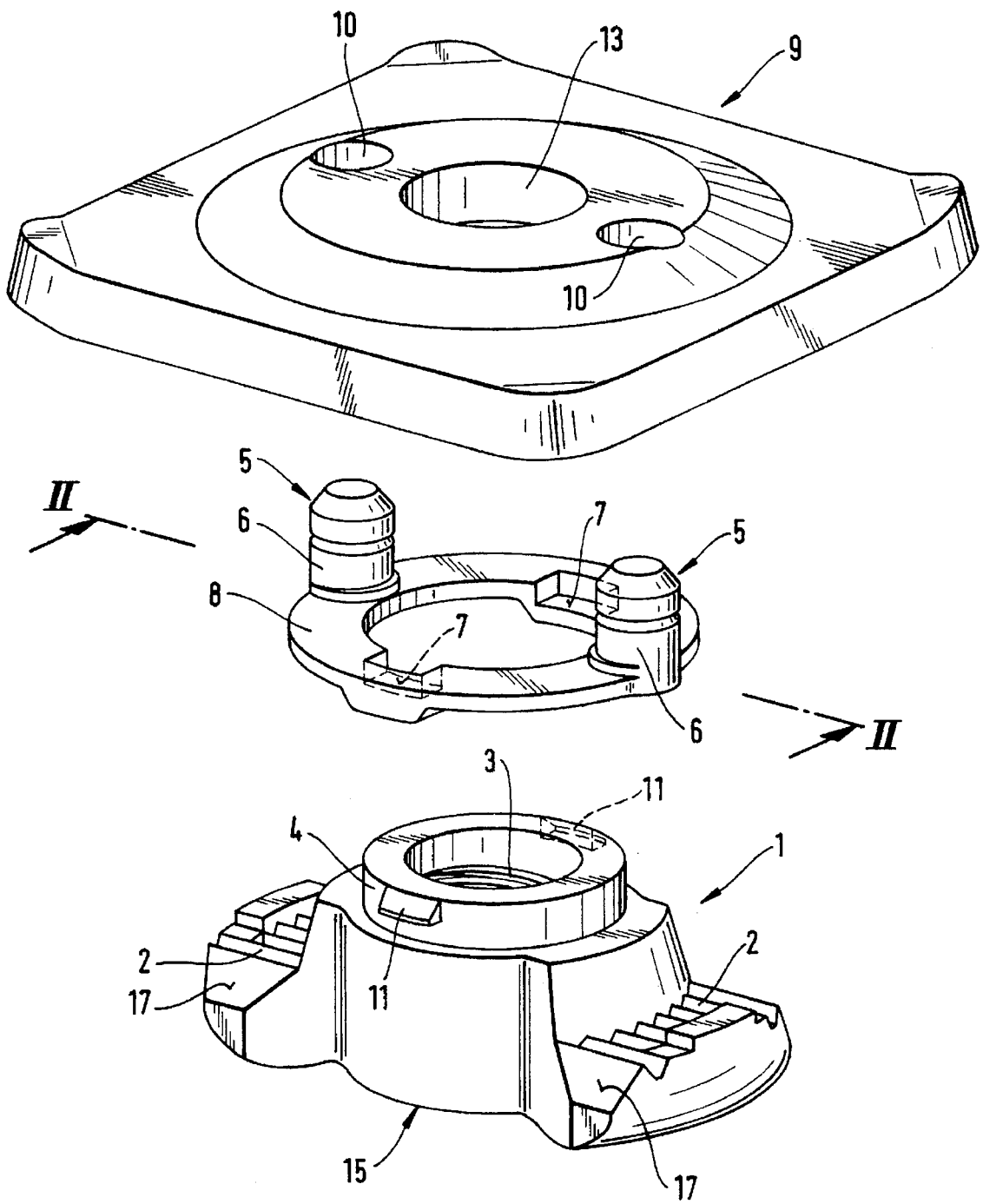
FIG. 1 is an exploded perspective view of an attachment device embodying the present invention.

In FIG. 1, a base member 1 of the attachment device has a hollow non-circular head 15 with a thread 3 formed inside of the head and with two toothed sections 2 projecting outwardly from the head on opposite sides and arranged parallel to one another. An intermediate member 9 has a centrally arranged through opening 13 having a diameter larger than the outside diameter of the inside thread 3 located in the base member 1. In addition, intermediate member 9 has two second anti-rotation surfaces 10 in the form of openings located diametrically opposite one another and outwardly from the through opening 13.

A spring element 5 shown between the base member 1 and the intermediate member 9 is capable of flexing in the axial direction. Two counterparts 6 in the form of pins are secured to the spring element 5 and are located diametrically opposite one another on a stop ring 8 and project axially from the ring so that they can cooperate with the openings 10 in the intermediate member 9. The diameter of the pins 6 is slightly greater than the diameter of the openings 10.

First recessed counter surfaces 7 in the form of edge surfaces are located in the spring element 5 and serve for the axially elastic securement of the spring element 5 to the intermediate member 9 with the edge surfaces formed by side recesses in the region of the through opening in the spring element. The first counter surfaces 7 can be placed in a snap-in-like connection with the first anti-rotation surfaces 11 in the form of projections extending outwardly from a hollow cylindrical extension 4 on the head 15. As can be seen in FIG. 1, the projections 11 are positioned to interengage with the first recessed counter surfaces 7.

Figure 2:
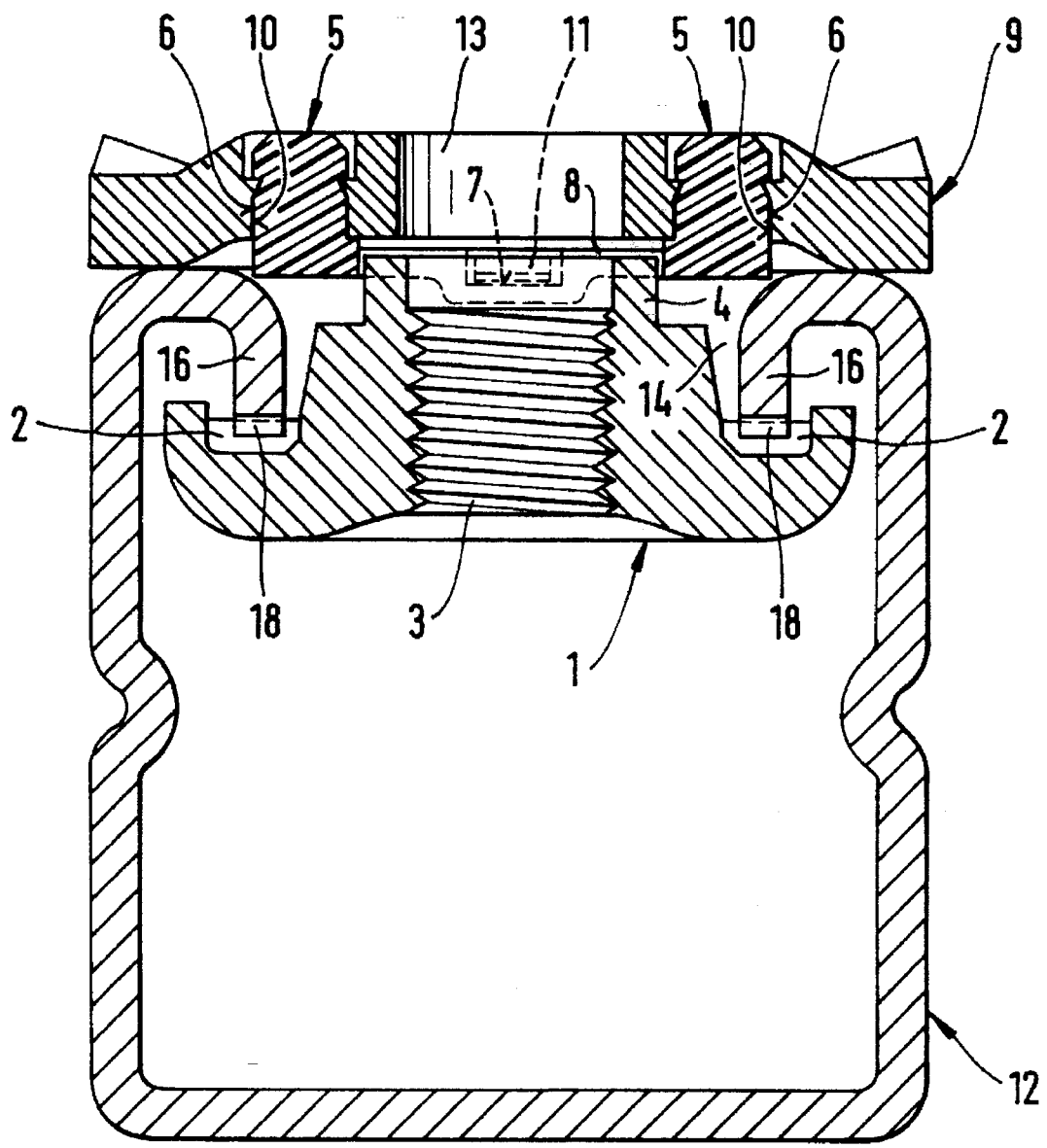
FIG. 2 is a cross-sectional view of the attachment device shown in FIG. 1 connected to a cooperating part.

The attachment device of the invention serves for securing pipelines to a cooperating part 12, note FIG. 2, in the form of an essentially C-shaped attachment rail having a slot-like opening 14 extending in its long direction. The width of the slot-like opening 14 is limited by two legs 16 bent inwardly into the hollow section of the rail, so that the legs are parallel to one another with their free ends facing into the hollow section of the rail. The free ends of the legs 16 are provided with tooth shaped surfaces 18. The matching toothed sections 2 are formed on the projections on the non-circular head 15.

If the attachment device as shown in FIG. 2 is placed into the slot-like opening 14 of the attachment rail 12 and turned through 90 degrees, the entry incline 17 on the base member 1 contacts the legs 16 on the cooperating part or rail. The entry incline 17 moves the base member 1 and the intermediate member 9 away from one another in the axial direction of the attachment device. Such movement imparts a pre-stress to the spring element 5. If the base member 1 reaches position where the toothed section 2 of the base member 1 engages in the toothed-shaped section 18 of the attachment rail, that is at the free ends of the legs, an axially displacement of the base member 1 takes place in the opposite direction towards the legs 16 by at least the amount of the tooth height of the toothed section 2. In this position the spring element is axially prestressed and displaced in the opening 14 of the attachment rail 12.

Figure 3:
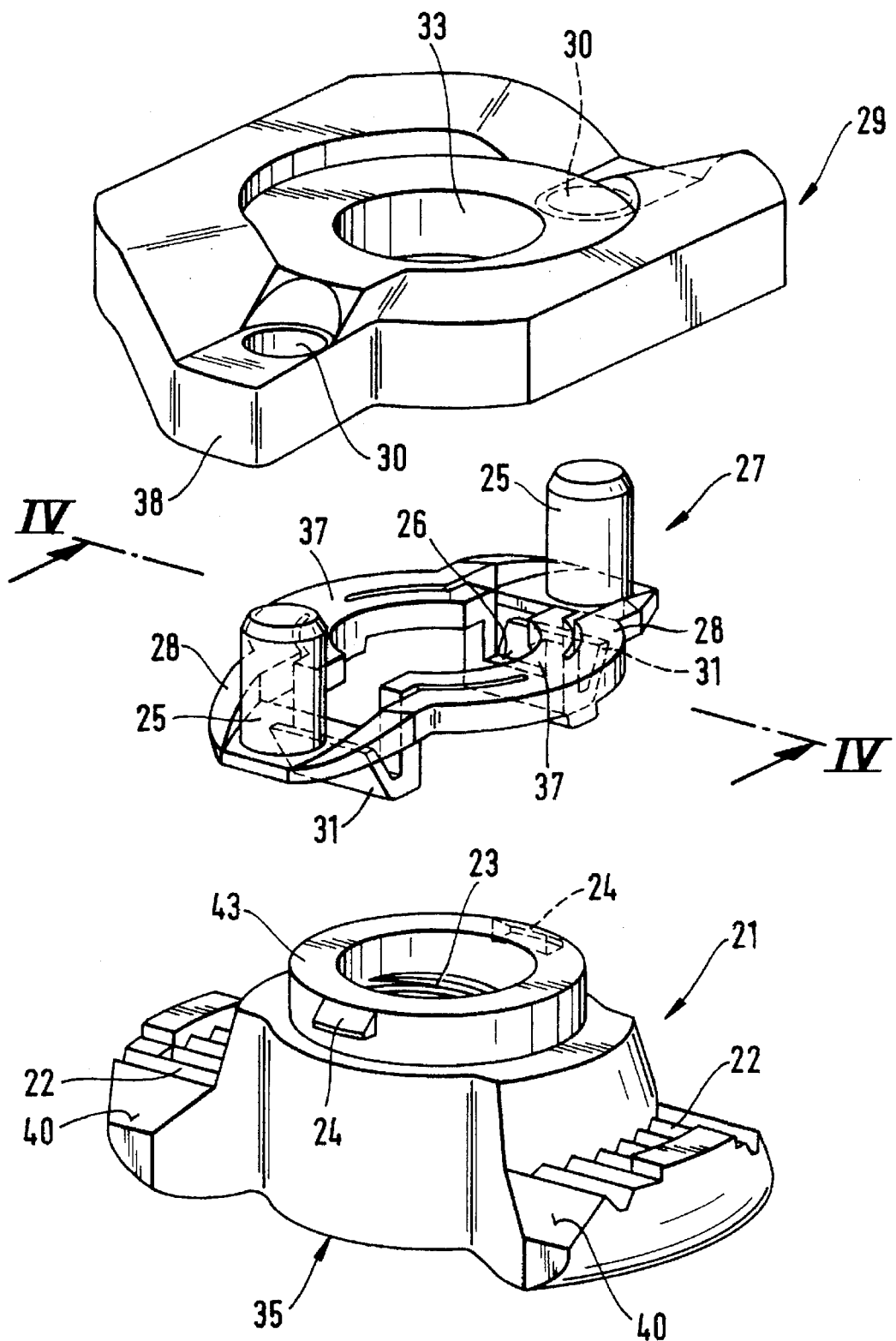
FIG. 3 is an exploded perspective view of another attachment device embodying the present invention.
Figure 4:
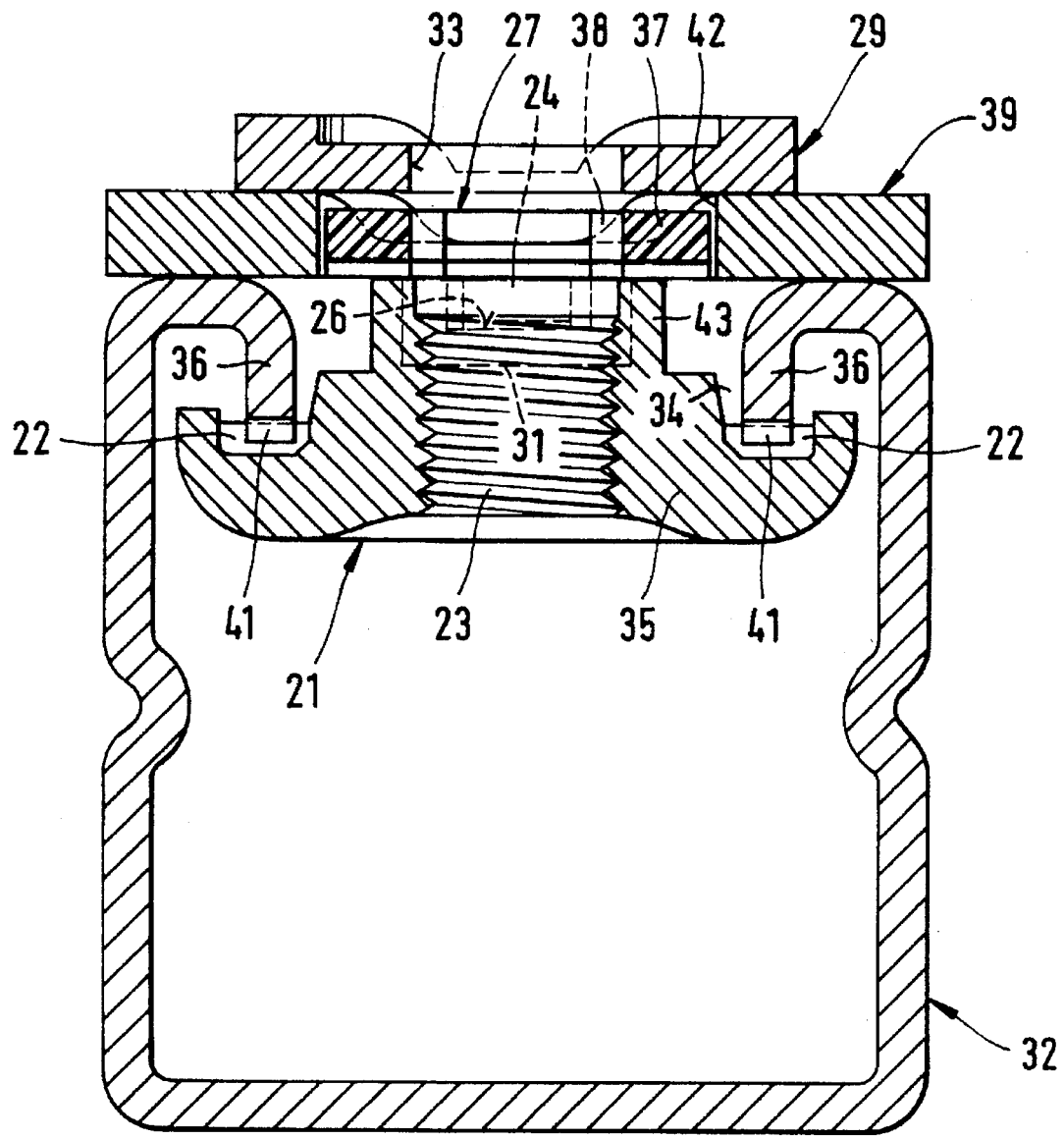
FIG. 4 is a cross-sectional view of the attachment device in FIG. 3 connected to a cooperating part with the addition of a component part.

The attachment device shown in FIGS. 3 and 4 comprises a base member 21, an intermediate member 29 and a spring element 27 positioned between the base member and the intermediate member.

In addition, the base member 21 includes a hollow non-circular head 35 containing an inside thread 23 and two first anti-rotation surfaces 24 in the form of projections at a hollow cylindrical axial extension of the head with the surfaces 24 located diametrically opposite one another.

Intermediate member 29 has a through opening 33 located in its central region and the diameter of the opening is larger than the outside diameter of the thread 23. Two second anti-rotation surfaces 30 in the form of openings are located diametrically opposite one another in the intermediate member 29. Two strip-shaped projections 38, located diametrically opposite one another, project outwardly from the intermediate member 29 and form a security against turning a cooperating part 39 shaped as a component, which can be fixed to the cooperating part 32 or attachment rail by the attachment device.

Spring element 27 has a through opening with a larger diameter than the outside diameter of the thread 23 in the base member 21. Further, spring element 27 has two first counter surfaces 26 in the form of edge-surfaces located diametrically opposite one another and two second counter surfaces 25 in the form of pins also located diametrically opposite one another with the first counter surfaces 26 offset through 90 degrees relative to the second counter surfaces 25. The diameter of the pins 25 is slightly greater than the diameter of the openings 30 in the intermediate member 29. The pins cooperating with the intermediate member 29 are located on an axially elastic region 28 of the spring element 27. Between the pins arranged as a pair, the spring element 27 has radially deflecting regions 31 whose outside diameter is larger than the width of the slot-like opening in the attachment rail 32, note FIG. 4. The radially deflecting regions 31 extend in diametrically opposite regions of the spring element 27. Each radially deflecting region 31 is connected by a connector web 37 with the axially elastic regions 28 of the spring element 27. The intermediate member 29 and the base member 21 are connected non-rotationally with respect to one another by the spring element 27.

In the attachment arrangement shown in FIG. 4 the attachment device connects the cooperating part 39 shaped as a component with the cooperating part 32 shaped as an attachment rail. To make this arrangement possible, the component 39 must have a central opening 42 through which the non-circular head 35 of the base member 22 as well as a portion of the spring element 27 can be pushed and serves to receive the anti-rotation device in the form of the strip shaped projections 38 on the intermediate member 29.

When securing the attachment device to an attachment rail, initially the attachment device is partially pushed through the cooperating part 39, in the form of a component, so that a snap-in-like connection is achieved between the component and the attachment device by means of the radially flexural spring element 27. Subsequently, the component 39 can be conveyed together with the attachment device to the attachment rail whose slot-like opening 34 is limited in its width by the two laterally spaced legs 36 with the legs bent off into the hollow section of the rail with their free ends being parallel to one another. The free ends of the legs 36 have a tooth-shaped section 41 cooperating with a matching tooth-shaped section 22 located between the entry inclines 40 on the base member 21 on opposite sides of the non-circular head 35. The base member 21 is aligned relative to the slot-like opening 34 in the attachment rail, so that it can be placed into the slot-like opening.

The strip-like projections 38 on the intermediate member 29 project into the central opening 42 in the component or cooperating part 39. Turning the base member 21 through 90 degrees by means of the intermediate member 29 affords the securement of the attachment device to the attachment rail, so that the entry inclines 40 disposed on the non-circular head 35 come into contact with the legs 36 of the attachment rail.

An axial displacement of the base member 21 relative to the intermediate member 29 occurs by means of the entry inclines 40, so that a portion of the spring element 27 elastic in the axial direction, is prestressed. By turning the entire attachment device, the radially deflecting regions 31 are unloaded in the direction of the largest extent of the central opening 42 in the cooperating part 39. As a result, the spring element 27 is freely movable in the region of the central opening 42 in the cooperating part 39 and in the opening 34 of the attachment rail.

When clamping the attachment device together with the cooperating part 39 against the attachment rail 32, an attachment element, not shown, in the form of a screw is passed through the central through opening 33 in the intermediate member 29 and through the opening in the spring element 27 into the inside thread 23 in the base member 21.

When the screw is turned, an axially drawing together of all the parts takes place, wherein particularly the axially elastic region 28 of the spring element is compressed and the strip shaped projections 38 of the intermediate member 29 are placed in engagement with the central opening 42 in the cooperating part 39. As a result, the connecting webs 37, located between the axially elastic regions 28 and the radially defectable regions 31 of the spring element 27, are deformed in the axial direction.

While specific embodiments of the invention have been shown and described in detail to illustrate the inventive principles, it will be understood that the invention may be embodied otherwise without departing from such principles.

We claim:

1. Attachment arrangement comprising a base member (1, 21), an intermediate member (9, 29), and a cooperating part (12, 32), said base member (1, 21) comprises a hollow non-circular head (15, 35) having an axis, a thread (3, 23) formed in said head and extending in the axial direction thereof, and first anti-rotation surfaces (11, 24) on said head, said intermediate member (9, 29) having at least one through opening (13, 33) extending in the axial direction of said head (15, 35) and second anti-rotation surfaces (10, 30) for providing a locked connection preventing rotation, wherein the improvement comprises that said cooperating part (12, 32) has a non-circular opening (14, 34) for permitting the insertion of said head (15, 35) of said base member (1, 21) in a specific angular position into said cooperating part (12, 32), and a spring element (5, 27) deflectable parallel to the axial direction of said head (15, 35) being positioned on said base member (1, 21), said spring element (5, 27) including an annular member (8, 28) and being positioned between said base member (1, 21) and said intermediate member (9, 29) relative to the axial direction of said head, said spring element (5, 27) comprises first matching surfaces (7, 26) cooperating and interengaging with said first anti-rotation surfaces (11, 24) on said head and second matching surfaces (6, 25) cooperating with said second anti-rotation surfaces (10, 30) on said intermediate member (9, 29), said first matching surfaces (7, 26) are formed by edge surfaces bordering an opening through said spring element (5, 27) and said first anti-rotation surfaces (11, 24) are formed by protections extending outwardly from a hollow cylindrical protection of said head (15, 35).

2. Attachment arrangement, as set forth in claim 1, wherein said spring element (27) is deflectable perpendicularly to the axis of said head and at least partially projects with a radially unloaded outside contour beyond a projection of the opening (34) in the cooperating part (32).

3. Attachment arrangement, as set forth in claim 4, wherein said second matching surfaces (6, 25) are formed by pins on said spring element extending in the axial direction of said head and said second anti-rotation surfaces (10, 30) are formed by openings in said intermediate member located on opposite sides of said through opening (13, 33).

4. Attachment arrangement, as set forth in claim 1, wherein said cooperating part (12, 32) comprises an attachment rail.

* * * * *